Nov. 28, 1967 N. E. HAGER, JR 3,354,720
TEMPERATURE SENSING PROBE
Filed Aug. 30, 1965
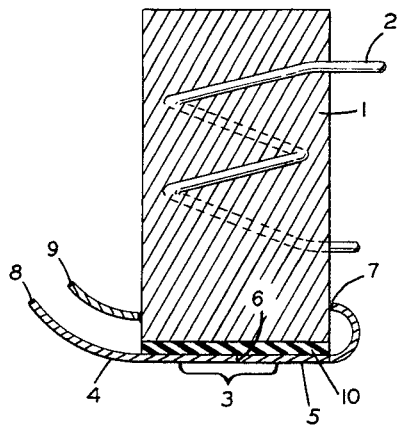
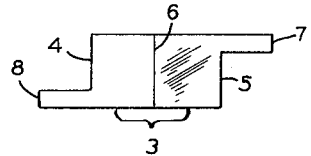
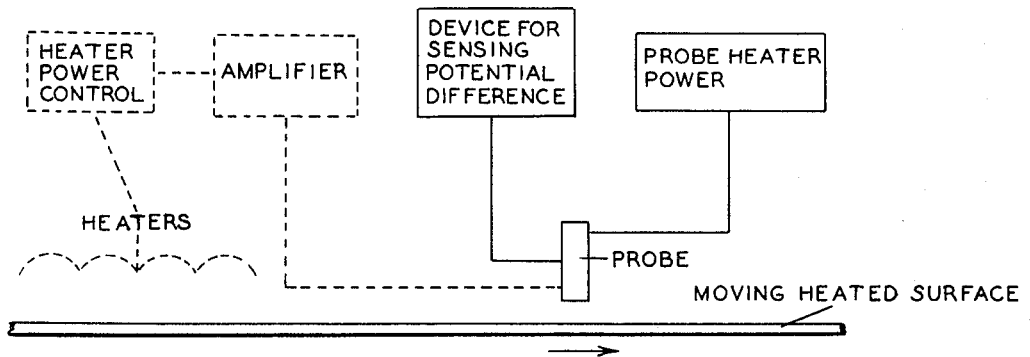
INVENTOR
NATHANIEL E. HAGER, JR.
BY Theodore L. Thomas
ATTORNEY

United States Patent Office 3,354,720
Patented Nov. 28, 1967

3,354,720
TEMPERATURE SENSING PROBE
Nathaniel E. Hager, Jr., Lancaster, Pa., assignor to Armstrong Cork Company, Lancaster, Pa., a corporation of Pennsylvania
Filed Aug. 30, 1965, Ser. No. 483,738
5 Claims. (Cl. 73—355)

This invention relates to a probe for measuring moving or stationary surface temperatures without contact with the surface. More specifically, the invention relates to a sensing device for temperature measurment which can be used for measurement or control purposes as desired. Still more specifically, the invention relates to a temperature sensing probe which operates at or near the temperature of the region to be measured.

Conventional pyrometers normally contain lenses, mirrors, or windows to focus or transmit the radiation from the object whose temperature is being measured. Such devices operate at or near room temperature. When such devices must function in a heated atmosphere filled with vapors, gases, smoke, and particles, the pyrometer and the windows and lenses and mirrors in it become fouled or coated with condensates or deposits. Such coatings change the readings and increase the error of the device, and may, if bad enough, render the pyrometer inoperable.

Accordingly, there is a need for a sensing probe to measure or control the temperatures in desired regions which will minimize fouling or coating with materials in the atmosphere in the region which the probe must occupy. It is a primary object of the present invention to fulfill this need.

This object is accomplished by a probe comprising a metal body. The temperature of the metal body is maintained at a desired temperature by a heating or cooling means which may be positioned in the interior or on the exterior of the metal body. Positioned on the body is a platelet of two dissimilar metal foils joined at corresponding edges to form a thermocouple junction at the joint. One of the two metals that make up the platelet will be identical with the metal from which the body is fabricated. Electrical insulation is positioned between the body and the platelet. An electrical connection exists between the body and the metal foil in the platelet which is dissimilar to the metal in the body. Two other electrical connections must be made, one from the body to a device for sensing potential differences, and the other from the remaining metal foil in the platelet to the device for sensing potential difference.

Although the metal from which the body is fabricated will preferably be copper, it may be any of the other metals normally used for making thermocouples, for example Chromel, constantan, Alumel, iron, or even the precious metal alloys such as platinum-rhodium. Copper is the metal of choice due to its relatively low cost and to the lack of unwanted EMF's generated when copper lead wires are used in the circuitry.

The body of the probe of the present invention may be fabricated in any convenient shape, preferably a small cylinder or rectangle. The body will generally be small, convenient dimensions being about 6 inches long, and about ¾ inch in diameter. The actual shape of the body may be dependent on how the body is to be heated and cooled, and how it is to be supported. Since the probe of the present invention will be used primarily for measuring elevated temperatures, a heating device or heating element of some kind must be incorporated in or around the body. A steam or hot water tracing may be used in which case the same tracing could be used with brine or other coolants to reduce the temperature of the probe substantially below room temperature. The heating element of choice will be an electrical resistance heating element which may be built into the probe by fabricating the probe in two matching pieces having interior grooves or voids to accommodate the electrical heating element. The heating or cooling portion of the probe may be of any convenient metal or design since it does not directly enter into the electrical performance of the probe in use. If an electrical resistance heater is used to heat the body of the probe, a suitable power supply will be required. The power supply should preferably be adjustable or controllable in order that the temperature of the body of the probe may be maintained at any desired temperature as will be described below. The body of the probe may also contain a thermocouple well or other means for determining the temperature of the probe. The metal body may also comprise a metallic plate adapted to be fastened to a plastic, wood, or ceramic support which may be flat, rod-shaped, or in any other configuration needed to support the body for a particular use.

Positioned on the body will be a platelet made up of two metal foils whose junction establishes a thermocouple. These metal foils will preferably be copper and constantan for use with a copper body. However, any of the thermocouple metals mentioned above may be used in the form of their thin foils. Such foils generally have a thickness in the range of 0.0001 to 0.1 inch. Electrical connections will be made between the probe of the present invention and a device for sensing potential differences. One of these connections will be from the metal body of the probe itself and the other will be from one of the metal foils comprising the platelet. The other of the metal foils comprising the platelet will be electrically connected to the body. Hence it is necessary that the metal in the body be identical with the metal in one of the two metal foils whose junction establishes the thermocouple and which make up the platelet. The platelet itself and the thermocouple junction it bears constitutes the sensing element in the probe and will be positioned on the body of the probe in a place convenient for facing the region whose temperature is to be measured. Normally, the platelet would be positioned at one end of the cylinder or bar which normally constitutes the body of the probe. The outer face of the platelet may be colored black, the better to absorb all thermal wave lengths and to render the platelet even more insensitive to color variation on the surface being measured. Carbon-loaded lacquers can be used to blacken the surface.

To prevent shorting of the thermally generated EMF across the thermocouple junction, the platelet must be electrically insulated from the body of the probe. The electrical insulation, however, preferably offers low thermal resistance in order that heat may readily flow across its thickness. This is not to say that the material itself must preferably be a good heat conductor. A poor heat conductor can be used as the electrical insulation when it is a sufficiently thin layer that heat readily flows across its thickness. Good heat conduction through the electrical insulation allows the probe to reach steady state conditions quicker during changes in the temperature of the surface being measured. A variety of materials may be used to electrically insulate the platelet from the body. Thin layers of any electrically insulating material such as synthetic resins, rubbers, natural resins, in the form of paints, lacquers, varnishes, or coatings may be used. A varnish may suffice where the temperatures to be measured are not so high to cause charring of the varnish. Resin saturated papers may be used. The papers may be made from cellulose or from mineral fibers such as asbestos when higher temperatures are contemplated. Thin layers of glass fiber cloth saturated with resins such as silicone resins are very useful and will withstand quite high temperatures. Ceramics can be used for even higher temperatures. As a guide when quick achievement of steady state conditions are desirable, the electrical insulation should have a thermal conductance of at least about 2 B.t.u. per hr.-ft.$^2$ ° F.

For quick response of the probe of the present invention, it is preferred that both the platelet and the electrical insulation be maintained as thin as possible in order to minimize heat capacity of the sensing portion of the probe. It has been established that a probe having a copper body, a copper-constantan foil platelet having a thermocouple junction achieved by edge welding the foils, the foils being 0.0002 inch thick, with a 0.005 inch thick layer of silicone-glass laminate as electrical insulation, will give excellent results. The insulation may be thicker in those instances where quick levelling off of the EMF output is not an important factor.

The foil in the platelet which is dissimilar to the metal in the body is electrically connected to the metal body by any convenient means. A convenient way to accomplish this is to leave a tab on the foil and simply bend the tab around the electrical insulation and solder the end of the tab to the body of the probe. The other metal foil will be connected to a device for sensing potential difference, as will the body of the probe. Since it is most convenient to use leads of copper wire, a copper wire connecting the copper body to the sensing device along with a copper wire connecting the copper foil of the platelet to the sensing device will be the system of choice.

The device for sensing potential differences will normally constitute microvoltmeters, the more sensitive the better as long as undue noise is not introduced. The microvoltameters may be connected to recorders in order to make a tracing or other indication of the response of the probe. An extremely sensitive microvoltmeter, termed a nanovoltmeter, is now available with a sufficiently low noise level that it can be used with the probe described herein to detect exceedingly minor voltage outputs from the thermocouple junction.

Alternatively, the output of the thermocouple junction may be coupled to an amplifier whose output may be used to control the heating elements which are supplying heat to the region whose temperature is being measured by the probe.

In operation, the probe of the present invention is positioned to place the platelet as close as physically possible to the region whose temperature is to be measured. For example, the platelet may be positioned about 1/8 inch away from a flat moving surface. The platelet will then assume the temperature of the moving surface. The body of the probe is then heated or cooled to the temperature desired in the region or surface whose temperature is to be measured. When this temperature is reached, the temperature of the body of the probe will be identical with the temperature of the platelet so long as the moving surface is at the desired temperature. Under such conditions, no thermoelectric current will be generated at the thermoelectric junction. The output of the probe will be zero. Should the surface whose temperature is being measured grow hotter, the thermocouple will generate an EMF proportional to the temperature difference between the body and the surface. Should the surface grow cooler than the body, the thermocouple EMF will again be generated, but in the opposite direction. The EMF is produced only when the platelet and the body are at different temperatures, and the temperature of the platelet will follow that of the surface being measured, in general. Since the probe output is proportional to the temperature difference between the body which is maintained constant and the platelet which varies with the surface being measured, this difference can be read directly from a suitable recorder, or it can be read from a suitable calibration curve. With this kind of circuitry, the probe operates as a null, non-contact temperature measuring device. Since the probe operates at the same temperature as the surface or region to be measured, there are no relatively cool surfaces on which liquids or solids may condense or sublime. It will be appreciated that the thermocouple EMF could be used to control the power input to heat or cool the probe body itself. With such a circuit, the probe will always assume the temperature of the surface or region whose temperature it is sensing, and the temperature of the probe body can be obtained by conventional means such as a thermocouple or thermometer well in the body of the probe where it is protected from becoming coated with condensates and the like. Combinations of such circuitry are also possible.

In operation with a black platelet, the probe will respond to all wave lengths given off by the observed surface, not selected wave lengths as with crystal windows, or short wave lengths as with photoelectric devices. Therefore there is less chance that absorption bands in any intervening gases will have a major effect on radiation picked up by the probe.

The invention will be better understood by reference to the attached drawing in which FIG. 1 is a simplified and modified section of the probe of the present invention, FIG. 2 is an enlarged view showing a preferred form of the platelet used on the probe, and FIG. 3 shows two of the possible arrangements for hooking up the probe of the present invention.

Referring to FIG. 1, the metal body 1 of the probe is heated or cooled with the heating or cooling element 2 which is shown in FIG. 1 as a hollow tube for conducting steam, water, or other heating or cooling medium through the body 1 of the probe. As mentioned earlier, the preferred heating or cooling element 2 is an electrical resistance heater. A platelet 3 is made of two dissimilar metallic foils 4 and 5 which when joined along the edges thereof form a thermocouple junction 6. The metal foil 4 in this figure will be identical with the metal of the body 1. An electrical connection 7 is made between the body 1 and the metal foil 5 which is dissimilar to the metal of the body 1. The metal foil 4 which is the same as the metal of the body 1 has an electrical connection 8 thereon for connecting to a device for sensing potential difference. The other electrical connection 9 will run from the body 1 of the probe to the other terminal of the device for sensing potential difference. Electrical insulation 10 separates the body 1 from the platelet 3.

Referring to FIG. 2, the platelet 3, made from the metal foils 4 and 5 to form the thermocouple junction 6 may have the configuration shown in order conveniently to form the electrical connections 7 and 8. In the preferred embodiment of the invention, the metal body 1 will be of copper, the metal foil 4 will be copper, the metal foil 5 will be constantan, and leads 8 and 9 will be of copper.

FIG. 3, which is self-explanatory, shows in solid lines the circuitry wherein the probe of the present invention may be used to measure the temperature departure of the moving heated surface from the temperature maintained in the probe. The dotted lines show the circuitry for using the probe with the probe heater power as a control device in order to constantly maintain the temperature of the moving heated surface at the temperature of the probe.

I claim:
1. A probe for non-contact temperature measurement comprising
   (1) a metal body,
   (2) means for maintaining a desired temperature in said body,
   (3) a platelet of two dissimilar metal foils joined at corresponding edges thereof to form a thermocouple junction and positioned on said body, one of said two metals being the same metal as that in said body,

(4) electrical insulation between said body and said platelet,
(5) an electrical connection between said body and the metal foil in said platlet dissimilar to the metal in said body, and
(6) electrical connections for making connections to a device for sensing potential differences on said body and on said metal foil in said platelet the same as the metal in said body.

2. A probe according to claim 1 wherein said metal body comprises copper.

3. A probe according to claim 1 wherein said platelet comprises a copper-constantan thermocouple.

4. A probe according to claim 1 wherein said means for maintaining a desired temperature comprises an electrical heater.

5. A probe according to claim 1 wherein said platelet has a black surface.

No references cited.

LOUIS R. PRINCE, *Primary Examiner.*

FREDERICK SHOON, *Assistant Examiner.*